United States Patent [19]

Yamamoto

[11] Patent Number: 4,798,375
[45] Date of Patent: Jan. 17, 1989

[54] DEVICE FOR FEEDING PHOTOSENSITIVE MATERIAL

[75] Inventor: Yuji Yamamoto, Wakayama, Japan

[73] Assignee: Noritsu Kenkyu Center Co., Ltd., Wakayama, Japan

[21] Appl. No.: 61,517

[22] Filed: Jun. 15, 1987

[30] Foreign Application Priority Data

Jun. 16, 1986 [JP]  Japan .................................. 61-92158
Jun. 23, 1986 [JP]  Japan .................................. 61-96602
Jul. 14, 1986 [JP]  Japan .................................. 61-108407

[51] Int. Cl.⁴ ............................................ B65H 5/00
[52] U.S. Cl. ...................................... 271/82; 271/272; 271/277; 354/319
[58] Field of Search ............................ 271/272–275, 271/277, 82, 264; 354/319; 355/27

[56] References Cited

U.S. PATENT DOCUMENTS 4,026,242  3/1977  Boschet ........................... 271/277 X
4,033,575  7/1977  Fujimoto .......................... 271/277 X
4,699,368  10/1987 Hiraoka et al. .................. 271/277 X Primary Examiner—Joseph J. Rolla
Assistant Examiner—Stephen B. Parker
Attorney, Agent, or Firm—Armstrong, Nikaido Marmelstein & Kubovcik

[57] ABSTRACT

A feeding device for photosensitive materials arranged between the printing unit and the developing unit of a photographic processor. A photosensitive material supplied from the printing unit is smoothly transported on the surface of a feed drum which intermittently rotates, synchronized with the speed of development at the developing unit. While the web is being fed, its leading and tail ends are pressed by presser bars against the drum surface. Also provided is a loop formation plate adapted to tilt gradually downwardly under the increasing weight of the photosensitive material lying thereon to allow it to slide down smoothly. Thus, the web is formed into a loop while hanging. The material is fed straight without meandering owing to an anti-meandering mechanism including a pair of restrictor frames for restricting the material from moving sideways and a roller for pushing the material into between the restrictor frames when it is in its operative position. Thus the photosensitive material is smoothly fed from the printing unit to the developing unit without suffering any damages on its surface and without wasting time.

3 Claims, 5 Drawing Sheets

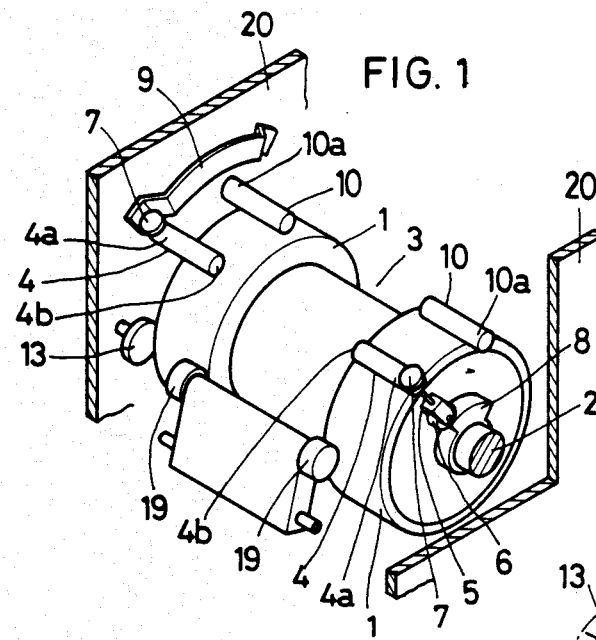
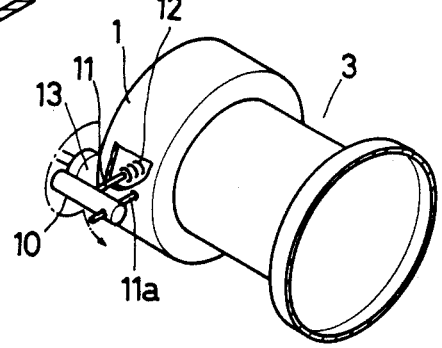
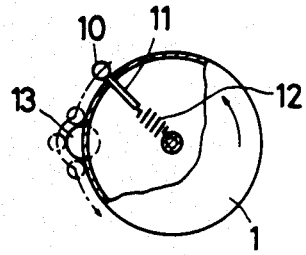
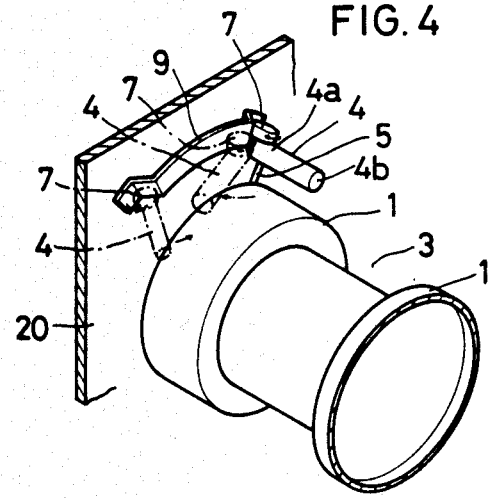
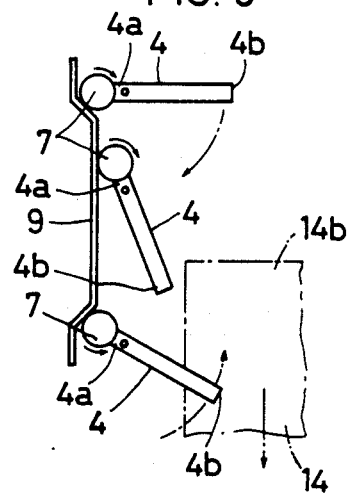

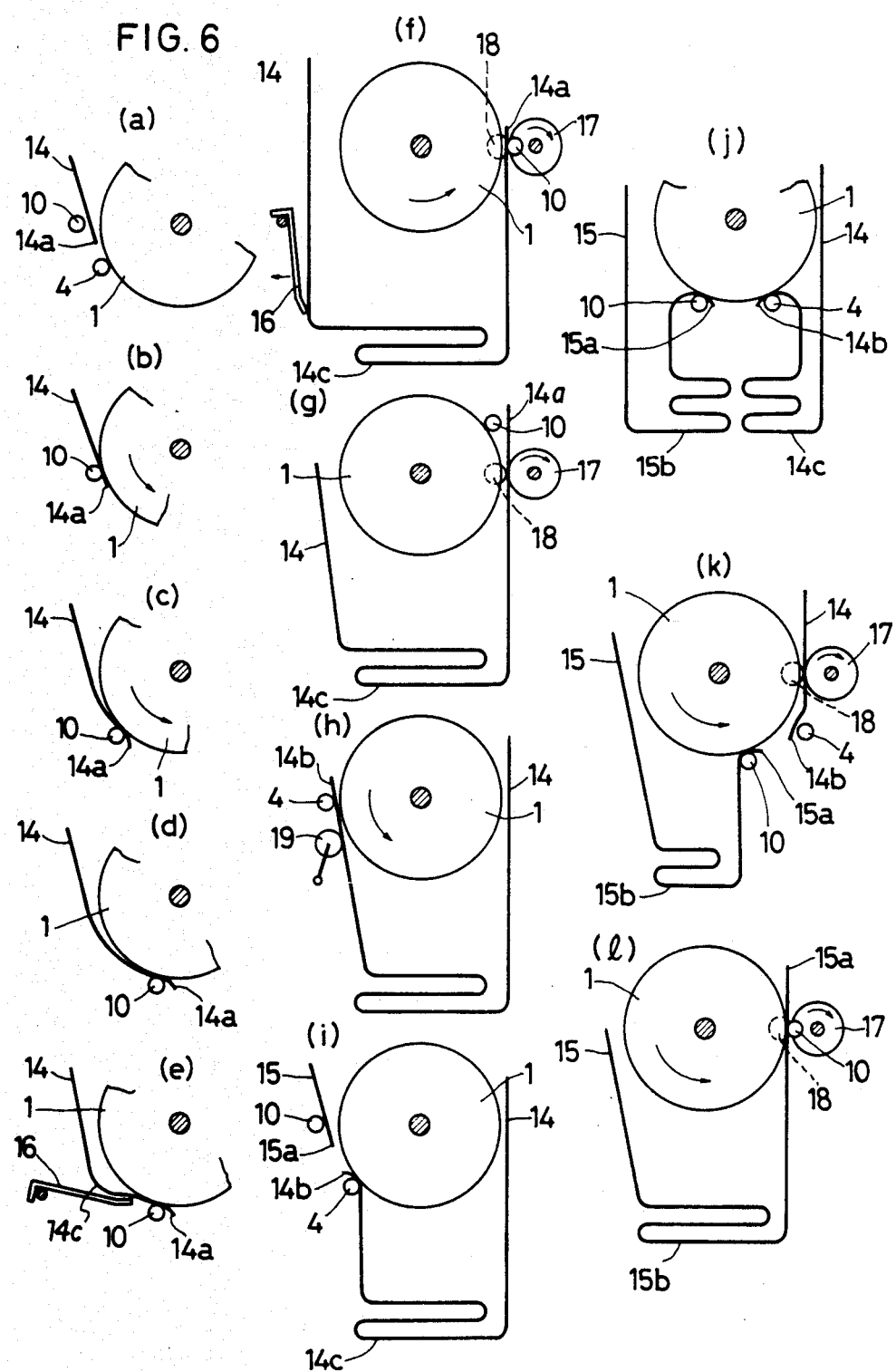

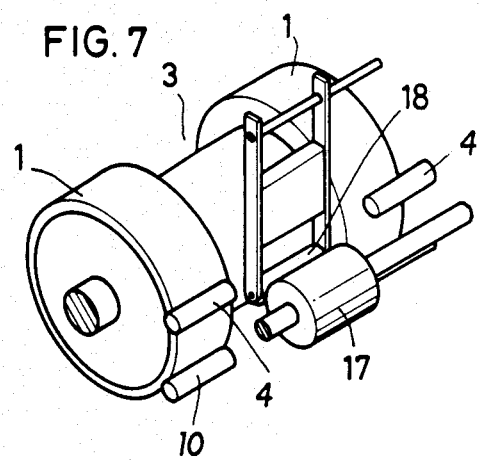
FIG. 7
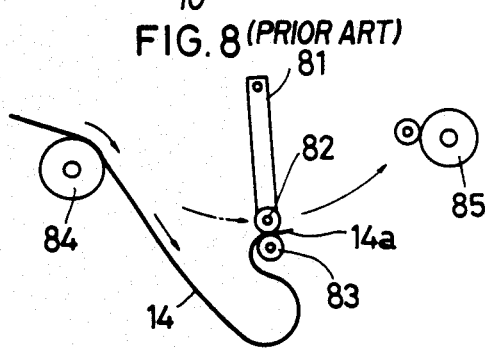
FIG. 8 (PRIOR ART)
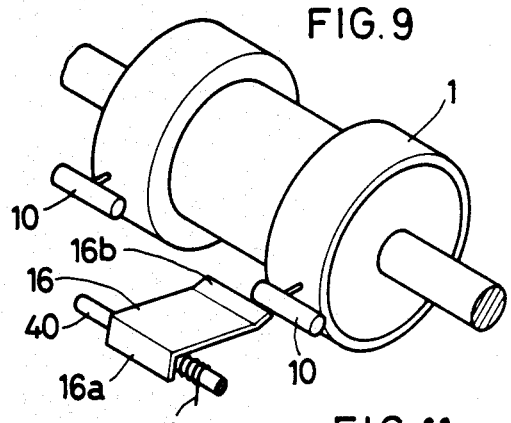
FIG. 9
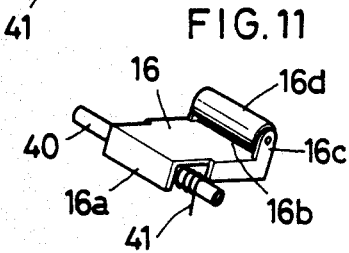
FIG. 11
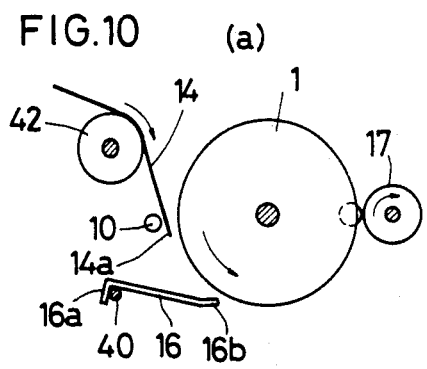
FIG. 10 (a)
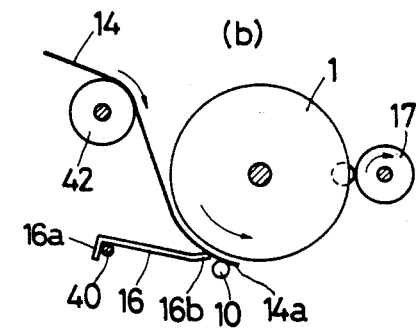
(b)
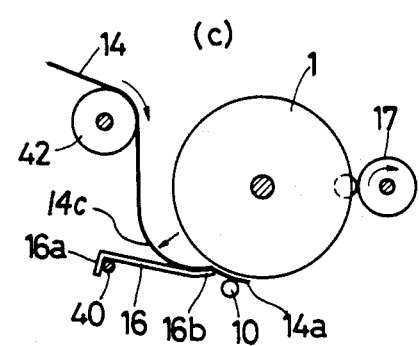
(c)
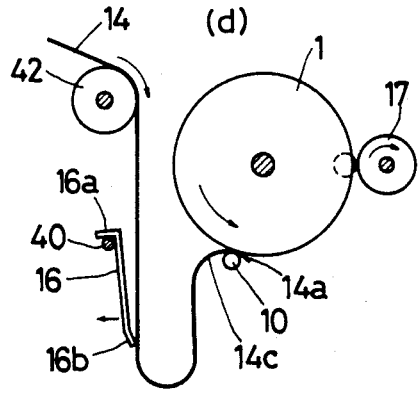
(d)

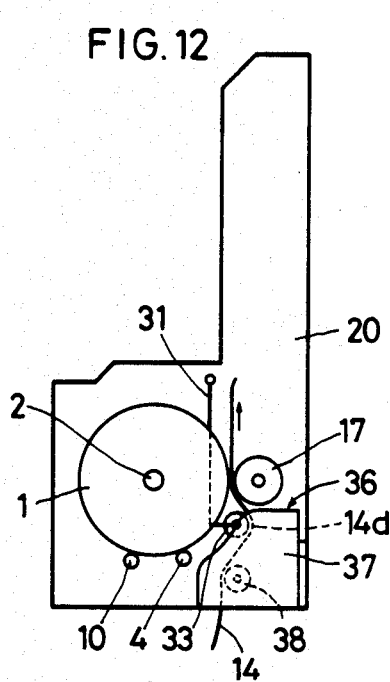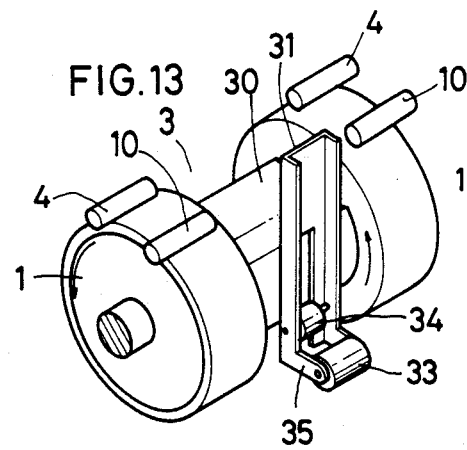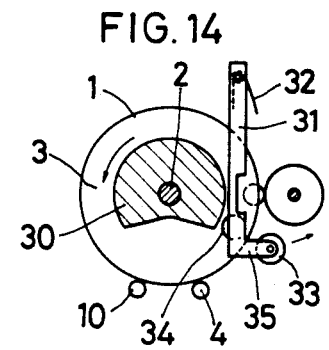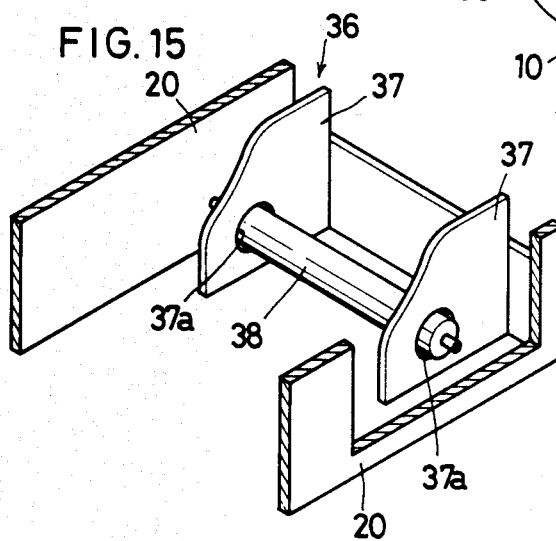

DEVICE FOR FEEDING PHOTOSENSITIVE MATERIAL

The present invention relates to a feeding device for feeding a photosensitive material from the printing unit to the developing unit in an automatic photographic processor.

With a conventional feeding device of this type, a web of photosensitive material supplied from the printing unit is guided by a guide to an intermediate driving roller in the developing unit and is cut to a predetermined length while forming a loop, leaving its tail hanging down after the cut.

A conventional feeding device is shown in FIG. 8 which comprises an arm 81 adapted to reciprocate between a roller 84 at the printing unit and a roller 85 at the developing unit in a pendulum-like fashion and a holding unit having a movable roller 82 and a pressure roller 83 mounted to the lower end of the arm 81 so as to be openably pressed against each other. With its head 14a held by the holding unit, a web of photosensitive material 14 from the printing unit is carried toward the developing unit with the swing of the arm 81 to pass its head 14a over to the intermediate driving roller 85 at the developing unit with the rotation of the movable roller 82. The pressure of roller 83 is then removed to release the head 14a from the holding unit and allow the arm 81 to swing back toward the printing unit. The holding unit on the arm 81 being swung back grips the tail of the photosensitive material 14 fed from the printing unit after being cut to a given length and keeps it holding until the material 14 is completely passed over to the developing unit. The arm 81 is swung slowly at a speed synchronized with the speed of development. The pressure roller 83 releases the tail after it has been passed over to the intermediate driving roller 85 with the rotation of the movable roller 82 to release the hold by the holding unit. This completes the feeding of a web of photosensitive material to the developing unit. Since it takes longer to develop a photosensitive material in various treating tanks in the developing unit than to expose it to light at the printing unit, the photosensitive material is slack in a loop so as to hang down while being fed in order to adjust this time lag.

The feed mechanism as described above, in which a photosensitive material is held in a standby position with its tail hanging down after being cut, has often caused problems such as scratches on the surface of the photosensitive material when its tail is rolled into the intermediate driving roller, or the malfunctioning of the mechanism. With the arm type feed mechanism in which its arm is swung like a pendulum, both ends of a web of photosensitive material are held by the single holding unit mounted on the lower end of the arm and sent to the developing unit. Since one web of photosensitive material is fed in every two strokes of the reciprocating motion of the arm between the printing unit and the developing unit and the next web cannot be supplied from the printing unit until the preceding web is cleared away, the feeding efficiency was poor.

An object of the present invention is to provide a feeding device in which a drum mechanism is used to carry a photosensitive material safely, stably and efficiently on its fairly large cylindrical periphery so as to obviate the abovesaid shortcomings.

In accordance with the present invention, there is provided a device for feeding photosensitive materials for use with a photographic processor, comprising a feed drum having a cylindrical surface, and head and tail presser bars provided on the cylindrical surface of the feed drum and adapted to press the head and tail of a web of photosensitive material against the drum surfaces, respectively.

With the present invention, a drum is employed to feed a photosensitive material while shaping a loop. The presser bars are provided on the drum surfaces in order to press the head and tail of a web of photosensitive material against the drum surfaces. Thus, a web of the material can be fed on the periphery of the drum rotating in one direction in a smooth, continuous and reliable way without intermision, eliminating the loss of time as with a conventional device.

Further, a photosensitive material drawn in and wound around the moderately curved arc surface of the feed drum is carried with the rotation of the drum so smoothly that there is no fear that folds or scuff marks might be made on the surface of the material by sharp folding or rubbing. Since the material is carried on the smooth and large arc surface with the rotation of the drum, with its head and tail pressed tight against the surface, the material is protected from being folded. This assures a beautiful finish of a photograph.

With the loop forming helping mechanism used in the present invention, the photosensitive material being continuously fed is formed into a moderately curved loop on the loop formation plate, pushing down the plate with an increase in its weight. The looped material is thus slid down from the plate to be put in position. Thereby, there is no fear that the material will be folded while being fed. Thus, no wrinkles such as cracks resulting from sharp folding will be made on the emulsion and substrate surfaces of the material, especially in its neck portion, during the loop forming step in the automatic processing of the photosensitive material. Consequently, no wrinkles will appear on the material when developed and the resulting photograph will have a good finish.

Other features and object of the present invention will become apparent from the following description taken with reference to the accompanying drawings, in which:

FIG. 1 is a perspective view of the feeding device embodying the present invention;

FIG. 2 is a partially cutaway perspective view of a portion of the feed drum showing how the head presser bar moves toward and away from the drum;

FIG. 3 is a diagrammatic side view of the same;

FIG. 4 is a perspective view of a portion of the feed drum showing how the tail presser bar pivots;

FIG. 5 is a diagrammatic plan view of the same;

FIGS. 6a to 6l are diagrammatic side views showing in sequence how the photosensitive materials are fed by the feeding device of the present invention;

FIG. 7 is a perspective view of the intermediate driving roller on the feedng device according to the present invention;

FIG. 8 is a diagrammatic side view of a prior art feeding device showing how it works;

FIG. 9 is a perspective view of the feeding device provided with the loop formation assembly;

FIGS. 10a to 10d are diagrammatic side views showing in sequence how the loop formation assembly works;

FIG. 11 is a perspective view of the support guide used in the present invention;

FIG. 12 is a diagrammatic side view of the feeding device provided with the anti-meandering mechanism;

FIG. 13 is a perspective view showing how the arm bar of the anti-meandering mechansim is mounted;

FIG. 14 is a vertical sectional side view of the same;

FIG. 15 is a partially cutaway view of the width guide of the anti-meandering mechanism.

Figure 16:
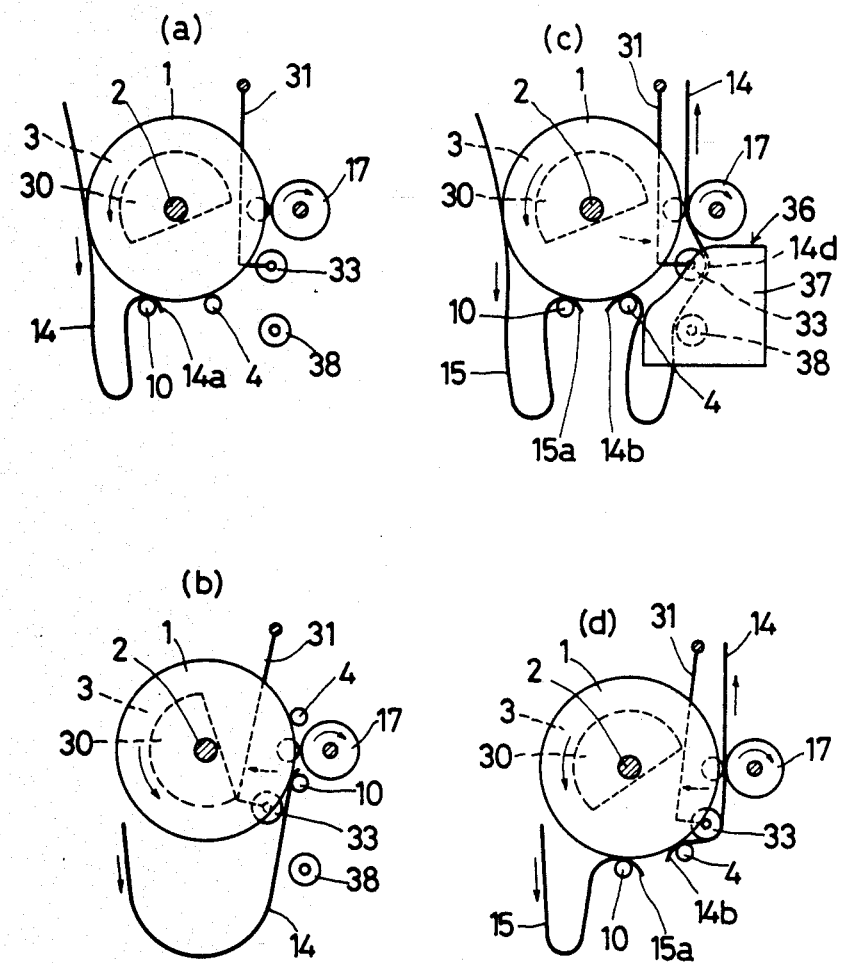
FIGS. 16a to 16d are diagrammatic side views showing how the anti-meandering mechanism works.

First referring to FIGS. 1 to 7, numeral 1 designates a feed drum having its central portion cut out into a recess 3 and formed with drum surfaces at both sides. The feed drum 1 supported by frames 20 at both sides is mounted on a shaft 2 so as to be rotatable in one direction, located between the printing unit and the developing unit so that its drum surfaces will be opposed to them.

On each drum surface, there is provided a tail presser bar 4 having its outer end 4a supported by a support bar 5 and normally biassed by a spring toward the axis of the drum 1. The presser bar 4 is adapted to move toward and away from the drum surface, keeping parallel with the axis of drum and further to pivot on the support bar 5 to turn its other end 4b horizontally in the direction of rotation of the drum 1 and to be restored to its original position by a spring or the like.

The tail presser bar 4 is provided at the tip of its support bar 5 with a presser bearing 6 kept in contact with a cam 8 mounted on the shaft 2, and on its elbow portion with a rotary bearing 7 adapted to come in contact with an arm guide 9 having projecting and recessed surfaces. The tail presser bar 4 is pushed up by the cam 8 against the bias of the spring into an open state when it comes to a predetermined position during the rotation of the feed drum 1. It is then pushed on its elbow portion by the arm guide 9 to turn its other end 4b horizontally by 90 degrees in the direction of rotation (feed direction).

When released from the cam 8 and the arm guide 9 with the subsequent rotation of the drum 1, the tail presser arm 4 will return to its original position parallel with the axis of the drum 1 so as to be biassed against the drum surface. Thanks to the mechanism for moving the tail presser bar 4 toward and away from the drum surface and pivoting it on the support bar 5, it can jump over the tail 14b of a photosensitive material 14 and hold it tight without damaging it.

Numeral 10 designates head presser bars provided immediately behind the tail presser bars 4 and arranged in parallel therewith. Each bar 10 is supported by a support bar 11 and is biassed toward the axis of the drum 1 by a spring 12 while being guide by a guide pin 11a so as to be movable toward and away from the drum surface. A presser bearing 13 provided on each frame 20 pushes up the outer end 10a of the head presser bar 10 against the bias of the spring 12 when it comes to a predetermined position during the rotation of the feed drum 1, setting the head presser bar 10 free. The outer end 10a then gets off the presser bearing 13 with the subsequent rotation of the feed drum 1 to restore the head presser bar 10 to its original state and pressed against the drum surface. Thus, the bars 10 arranged in parallel with the axis of the drum will enable the feed drum 1 to hold and feed webs of photosensitive materials 14, 15 supplied in succession from the printing unit without interruption.

When it comes to a desired position during the rotation of the feed rum 1, the tail presser bars 4 and the head presser bars 10 are pushed up and turned by such actuators as the cams 8, arm guides 9 or pressure bearings 13 to automatically hold and release the head and tail of a photosensitive material being carried on the drum, thus providing a smooth feed by the drum 1.

The feeding process will be described in more detail with reference to FIGS. 6a to 6l. Firstly in FIG. 6a, the head 14a of the photosensitive material 14 supplied from the printing unit is inserted under the head presser bars 10 lifted from the drum surfaces; the head 14a is pressed against the drum surface by the presser bars 10 in FIG. 6b; the feed drum 1 rotates and stops in FIGS. 6c, 6d; the material 14 is further fed and formed in a loop 14c on a loop formation plate 16 in FIG. 6e; the plate 16 tilts downwardly under gravity with increase in lengh of the loop 14c, allowing the loop 14c to slide down in FIG. 6f;

In FIG. 6g, the head 14a is passed to an intermediate driving roller 17, while being released from the head presser bars 10 which are now pushed up; in FIG. 6h, the tail presser rollers 19 press against the drum surface the portion immediately ahead of the tail 14b of the material 14 cut and supplied from the printing unit with the rotation of the drum 1; in the meantime, each tail presser bar 4 brought to the side of the printing unit is pushed up and turns its one end 4b by 90 degrees through the underside of the photosensitive material 14 to a position outside its edge keeping parallel therewith; the tail presser bar 4 then turns its end 4b back to its original position parallel with the axis, passing over the tail 14b which is in contact with the arc surface of the drum 1 and press the portion just ahead of the tail 14b against the drum surface (see FIGS. 4, 5), while the tail presser rollers 19 are released;

in FIG. 6i, the head presser bar 10 located right behind the tail presser bar 4 is pushed up with the rotation of the drum 1 to allow the head 15a of another web 15 of photosensitive material supplied from the printing unit to slide thereunder; in FIG. 6j, the head 15a is pressed against the drum surface by the head pressure bar, while the drum 1 stops rotating to form the material into a loop 15b; meanwhile, the material 14 is being fed without interruption into the developing unit by the intermediate driving roller 17;

in FIG. 6k, as the material 14 is fed into the developing unit and as the loop 14c is running short, the drum 1 starts rotating, pushing up the tail presser bars 4 to release the tail 14b and feed the material 14 into the developing unit by means of the intermediate driving roller 17; in FIG. 6l, the head 15a of the next material web 15 fed with the rotation of the drum 1, being held by the head presser bars 10, is passed over to the intermediate driving roller 17; the steps in and after FIG. 6f are repeated for the following materials. Numeral 18 in the drawings designates a pressure roller which is pressed against the intermediate driving roller 17.

Referring now to FIGS. 9 through 11, the loop formation plate 16 is a metal plate having a desired width and length and having one end 16a pivotally mounted on a shaft 40 so as to be pushed up to a horizontal position by a spring 41. The other end portion 16b of the plate 16 is located under the central portion of the feed drum 1 supported on a shaft which is parallel with the shaft 40.

FIGS. 10a to 10d show how the loop formation assembly works. In FIG. 10a, the head 14a of the photosensitive material 14 is pressed against the surfaces of the feed drum 1 by the head presser bars 10; the feed drum 1 rotates until it is stopped at a predetermined position in FIG. 10b; in FIG. 10c, the neck portion 14c behind the head 14a of the material 14 held by the presser bars 10 rests on the end portion 16b of the loop formation plate 16 which is horizontally held at the same level; the material 14 being fed from the printing unit gradually curves on the horizontal surface of the plate 16 to form a loop; as the loop of the material 14 on the plate 16 grows in weight, the plate 16 gradually tilts downwardly against the bias of the spring 41 under the weight of the loop, letting down the loop of the material 14 held thereon; the feed drum 1 then starts rotating again, while the presser arms 10 are raised when they are brought to the side of the developing unit, releasing the head 14a of the material 14. Thus the material 14 is passed over to the intermediate driving roller 17.

With the present invention, the loop formation plate 16 may have its end portion 16b curved downwardly to form a smooth surface (not shown) or may have a guide roller 16d on an elbow portion 16c formed at its end portion 16b, as shown in FIG. 11. Thus, the emulsion coated surface of the material 14 is protected from being damaged when it is slid down in a loop formed on the plate 16 owing to the smoothed surface on the end portion 16b of the plate 16 or the rotation of the guide roller 16d.

Next, reference is made to FIGS. 12 to 16. Numeral 31 designates an arm bar located on the side of the developing unit and having its upper end pivotally mounted so as to be rockable in a direction normal to the axis of the drum 1, while being urged by a spring 32 toward the axis of the drum 1. The arm bar 31 is provided with a guide roller 33 at the end of an outwardly extending elbow portion 35 to reduce the frictional resistance which acts on the photosensitive material being fed, and with an inwardly directed cam roller 34 at its mid-portion in contact with a pusher cam 30 of the feeding device.

In FIG. 15, numeral 36 designates a width guide which comprises a pair of side restrictor frames 37 and a free roller 38. The free roller 38 is loosely mounted through holes 37a formed oppositely and at the same level in the restrictor frames 37 secured to the frame 20.

Now, it will be described how this anti-meandering mechanism works with reference to FIGS. 16a to 16d. As shown in FIG. 16a, with the head 14a of the photosensitive material 14 fed from the printing unit pressed against the drum surface by the head presser bars 10, the feed drum 1 rotates and stops at a predetermined position, so that the material 14 being continuously fed from the printing unit slackens to form a loop. In this state, the arm bar 31 is pushed out by the cam-shaped pusher 30 against the bias of the spring 32. In FIG. 16b, the feed drum 1 starts rotating again, while the pesser bar 10 is raised to release the head 14a of the material 14, passing it over to the intermediate driving roller 17 at the developing unit. In this state, the arm bar 31, being released from the cam-shaped pusher 30, is received in the recessed portion 3 of the drum 1 so as not to stand in the way of the photosensitive material being fed.

Next in FIG. 16c, the feed drum 1 is rotated as the material is fed to the developing unit, and it is automatically cut to a desired length. Its tail 14b is then held by the tail presser bars 4 to carry it until they come to a predetermined position and the drum 1 stops. While the material 14 is being fed to the developing unit by the intermediate driving roller 17, a hanging portion of the material 14 near the intermediate driving roller 17 is pushed outwardly by the guide roller 33 at the lower part of the arm bar 31 which has been pushed out of the recess 3 by the cam-shaped pusher 30 against the bias of the spring 32.

A turned portion 14d formed by tucking up the loop is thrust in between the side restrictor frames 37 of the width guide 36 opposite to the guide roller 33. Thus, with the feed direction of material 14 controlled by the restrictor frames 37 on both sides thereof and with its hanging portion which follows the turned portion 14d pushed out by the guide roller 33 hanging on the free roller 38, the looped portion of the material 14 is sent out by the intermediate driving roller 17. Since the free roller 38 is passed through the holes 37a of the restrictor frames 37 with a play so as to be loosely rotatable, the frictional resistance between the guide roller 33 and the turned portion 14d of the material 14 can be automatically controlled to a low level. Thus, the photosensitive material can be fed smoothly in the anti-meandering mechanism. In the meantime, the head presser bars 10 brought to the printing unit with the rotation of the feed drum 1 hold the head 15a of the next material 15 to form another loop out of it.

Further as shown in FIG. 16d, as the feed drum 1 rotates, with the presser bars 4 holding the tail 14b of the material 14 close to the intermediate driving roller 17, the arm bar 31 is released from the cam-shaped pusher 30 to gradually retreat into the recess 3, and the guide roller 33 of the arm bar 31 is removed from between the restrictor frames 37. At the same time, the presser bars 4 are raised to release the tail 14b of the material 14 from the feed drum 1 and pass it over to the developing unit through the intermediate driving roller 17. The abovesaid feeding process from the printing unit to the developing unit is repeated for the subsequent photosensitive materials to prevent them from meandering.

What is claimed is:

1. A device for use with a photographic processor to feed a web of photosensitive material comprising:
   a cylindrical feed drum rotatable about a horizontal axis;
   at least one head presser bar movably mounted on a peripheral surface of said cylindrical feed drum so as to be movable toward and away from the axis of said feed drum;
   at least one tail presser bar pivotally mounted on said peripheral surface of said cylindrical feed drum about a pivot axis extending radially outwardly from the cylindrical surface of the feed drum, said tail presser bar being circumferentially spaced from said head presser bar, and pivotal movement of said tail presser bar moving it between a first position parallel to said drum axis and a second position so as to move one end thereof toward and away from said drum surface;
   means operable in synchronism with rotation of said feed drum to move said head presser bar away from said surface at a first rotational position of said drum to accept a head end of said web, fed from a first unit of said photographic processor, between said head presser bar and said drum surface, and thereafter to move said head presser bar toward said surface to press and hold said web head end thereagainst;
   means operable in synchronism with further rotation of said feed drum to raise and pivot said tail presser bar away from said drum surface at a second rotational position of said drum so as to receive a tail end of said web between said tail presser bar and said drum surface, and thereafter to lower and pivot said tail bar toward said surface so as to press and hold said web tail end against said surface;

further rotation of said drum moving said web head end to a second unit of said photographic processor, circumferentially remote from said first unit of said photographic processor, said second unit having means positioned near said drum to receive said head end of said web and draw said web into said second unit; and means operable in synchronism with rotation of said feed drum for moving said head presser bar and said tail presser bar away from said drum surface to release said head end and said tail end, respectively, adjacent said second unit receiving means.

2. A device as claimed in claim 1 wherein said tail presser bars are located circumferentially ahead of said head presser bars with respect to the direction of rotation of said feed drum.

3. A device as claimed in claim 2, wherein said feed drum is circumferentially smaller at its central periphery to form a recessed drum portion and a pair of end drum sections, and a head presser bar and tail presser bar are provided on each of said end drum sections.

* * * * *